(No Model.)

J. D. HAWKINS.
TAG HOLDER.

No. 310,201. Patented Jan. 6, 1885.

WITNESSES.
Chas. N. Leonard.
E. W. Bradford.

INVENTOR.
James D. Hawkins,
PER
C. Bradford,
ATTORNEY.

UNITED STATES PATENT OFFICE.

JAMES D. HAWKINS, OF BRAZIL, INDIANA.

TAG-HOLDER.

SPECIFICATION forming part of Letters Patent No. 310,201, dated January 6, 1885.

Application filed May 20, 1884. (No model.)

*To all whom it may concern:*

Be it known that I, JAMES D. HAWKINS, of the town of Brazil, county of Clay, and State of Indiana, have invented certain new and useful Improvements in Tag-Holders, of which the following is a specification.

My said invention consists in an improved construction of tag-holders, by the use of which the tag is allowed to swing freely upon said holder after being attached to the article which is to be tagged, and a secure attachment is made, as will be hereinafter more fully described.

Figure 1:
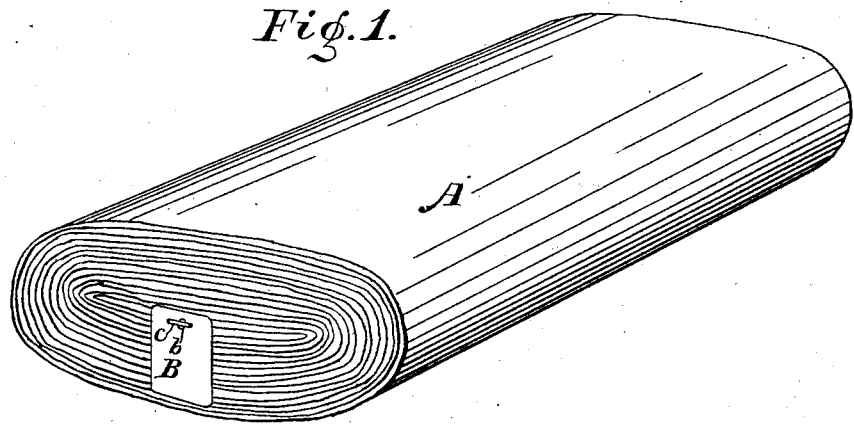
Figure 2:
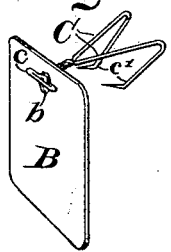
Figure 4:
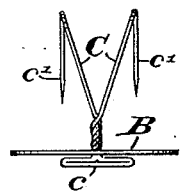
Figure 3:
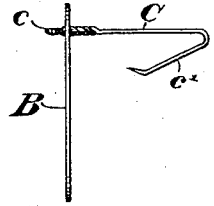
Figure 5:
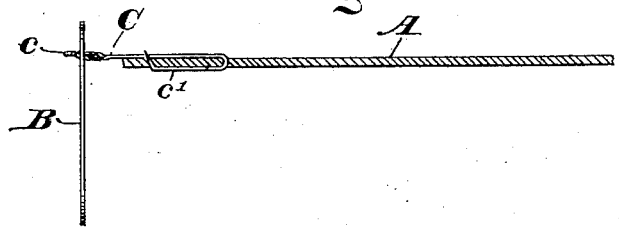

Referring to the accompanying drawings, which are made a part hereof, and on which similar letters of reference indicate similar parts, Figure 1 is a perspective view of a bolt of cloth with a tag attached by my improved holder; Fig. 2, a similar view of the tag and holder separately; Fig. 3, a side elevation thereof; Fig. 4, a top or plan view of the same, and Fig. 5 a similar view showing the hooks closed into the cloth as when in use.

In said drawings, the portions marked A represent the bolt of cloth, B the tag, and C the holder. The tag B is of any suitable material or size desired, and has an eye, $b$, preferably in one end, through which the holder is inserted and secured thereto, as will be presently described. The holder C is preferably formed of wire, and has a straight shank between a head-piece, $c$, and the hooks $c'$, on which part the tag is mounted, as shown. It is formed by bending a piece of wire of suitable size and length in the middle, forming the head-piece $c$ on the bent end, and then twisting the ends together for a sufficient distance to form a suitable neck for the tag to hang upon. The two ends are then spread apart, as shown, and extend out, and are formed into hooks by bending back the ends. The tag is placed in position upon the neck part during the operation, and before the ends are spread out, as will be readily understood. The holder is attached to the articles by inserting the hooks through a portion thereof, and bending the points down alongside their shanks, in the manner indicated by Fig. 5, and is thus securely held in position.

The advantages of my invention are obvious to those accustomed to use such articles. The tag being pivoted on a straight neck cannot get wrong side up, no difference how often the article to which it is attached is turned over, and is thus always in a position to be easily seen without handling, by which tags are frequently blurred and defaced. The tag bears against the T-shaped head for its whole length, and any strain that may come on said tag is thus better resisted, and the tag less easily torn.

Having thus fully described my said invention, what I claim as new, and desire to secure by Letters Patent, is—

1. The combination of a tag and a tag-holder, said tag-holder having a head part upon one end, and having hooks formed on its other end, with a single neck portion between said head and said hooked portions, upon which said tag is placed, whereby a tag-holder is provided adapted to fasten into the end of a bolt of cloth and hold the tag face outward at all times, substantially as set forth.

2. The combination, with a tag, of a tag-holder formed of a single piece of wire doubled together and having a head-piece formed on said double part, and the ends of said wire being extended out and formed into hooks, and a straight neck-piece being formed between said head-piece and said hooks, upon which the tag is mounted, whereby said tag is enabled to maintain its position when attached to an article regardless of the position of said article, substantially as set forth.

3. The combination of the tag B and holder C, said holder having a head-piece, $c$, and hooks $c'$ formed thereon, and said tag being mounted upon a neck-piece between said parts, substantially as described, and for the purposes specified.

In witness whereof I have hereunto set my hand and seal at Brazil, Indiana, this 16th day of May, A. D. 1884.

JAMES D. HAWKINS. [L. S.]

In presence of—
   HARVEY C. KEITH,
   E. S. HOLLIDAY.